United States Patent [19]

Johnson

[11] Patent Number: 4,734,970

[45] Date of Patent: Apr. 5, 1988

[54] ELECTRONIC IGNITION TIMING COIL REPLACEMENT METHOD

[75] Inventor: Jeffrey S. Johnson, Milwaukee, Wis.

[73] Assignee: Electro-Chem Corp., Milwaukee, Wis.

[21] Appl. No.: 861,319

[22] Filed: May 9, 1986

[51] Int. Cl.[4] .................................... B23Q 7/00

[52] U.S. Cl. .................................... 29/407; 29/271

[58] Field of Search ............... 200/19 M; 29/271, 274, 29/407

[56] References Cited

U.S. PATENT DOCUMENTS

| | | | |
|---|---|---|---|
| 1,941,022 | 12/1933 | Shelley | 29/274 |
| 1,976,156 | 1/1935 | Nelson | 29/274 |
| 2,067,442 | 1/1937 | Frisz | 29/274 |
| 3,069,762 | 12/1962 | Sonnier | 29/271 |
| 3,254,247 | 5/1966 | Falge | 200/19 M |
| 3,685,126 | 8/1972 | Kane | 29/271 |
| 4,129,107 | 12/1978 | Boyer | 200/19 M |

*Primary Examiner*—P. W. Echols
*Assistant Examiner*—Irene Graves Golabi
*Attorney, Agent, or Firm*—Andrus, Sceales, Starke & Sawall

[57] ABSTRACT

An inexpensive and reliable tool accurately orients pick-up core assembly and checks the bushing runout in an electronic ignition unit for automobile. The tool includes a T-shaped member having a precisely formed centering and locating shaft of a precise length in combination with an integral core locating plate radially projecting from the locating shaft. The length of the pin or shaft is selected to precisely locate the core locating plate. The electronic ignition unit includes a magnetic trigger unit having a trigger coil mounted within a distributor. An annular magnetic core has pyramidal trigger elements and the rotor has closely spaced opposed pyramidal trigger elements. Accurate, precise location of the pyramidal elements and the sharp opposed edges are critical to proper ignition. The tool has the shaft located within the rotor bushing and precisely locates the locating plate, which precisely locates the core in precise concentric aligned orientation to the rotor axis. The tool may be formed for one ignition module unit with the locating plate formed having a precisely formed annular face which is precisely parallel and concentrix with the periphery of the locating pin. Alternatively, the locating plate is formed with a chamfered edge face, with the chamfer precisely located and constructed to provide alternate annular surfaces for different ignition module units.

2 Claims, 1 Drawing Sheet

ELECTRONIC IGNITION TIMING COIL REPLACEMENT METHOD

BACKGROUND OF THE PRESENT INVENTION

The present invention relates to an electronic ignition timing coil replacement tool and particularly to such a tool for the accurate orientation of the operating components with respect to an electronic trigger coil.

Internal combustion engines include a distributor for sequentially coupling of the several cylinder ignition devices to a high voltage power supply and thereby providing the repetitive sequential firing of the cylinders. Ignition during a precise period of each 360 degree cylinder functioning is significant and practically critical to proper and optimum engine operation. High voltage electronic ignition systems have been developed with the advent of solid state electronic devices. The electronic ignition systems maintain use of a distributor. However, the conventional contacts which were used to open and break the circuit of a high ignition coil have been replaced with magnetic pickup or trigger units for controlling the sequential transfer of energy through a solid state circuit for firing of the cylinders in the repetitive sequence. In such systems, a pickup or trigger coil is mounted within the distributor unit to generate triggering pulses which are fed to the ignition circuit to establish sequential firing of the cylinders. The distributor includes magnetic pulse signal forming devices including a magnetic rotating element which rotates into sequential alignment with magnetic elements coupled to a trigger coil to create time spaced pulses in the coil. A shaping circuit is connected to the coil to generate trigger signals with the alignment of the rotating magnetic elements. In a particular configuration, an annular magnetic core has generally sharp-pointed pyramidal elements circumferentially distributed about the inner surface and an opposed pyramidal rotor element rotatably mounted there. As the magnet rotor element moves past the sharp-pointed core elements, the magnetic flux change is such as to generate a signal pulse in the coil. The accurate, precise location of the elements is critical to proper functioning of the ignition system. Any physical engagement between the core elements and the rotor element will rapidly destroy the fine sharp or pointed ends creating a distorted air gap, and create ignition misfiring and generally poor engine operation. Similarly misalignment of the rotor and core can vary the air gap and create mistriggering of the ignition system. The coil is generally an encapsulated unit mounted within the distributor and connected in circuit through suitable fine circuit leads. The coil proper and in particular the connecting leads are a further common source of ignition malfunction. Whenever the coil is replaced the rotor must be removed and accurately replaced with respect to the pick up units.

Location and accurate positioning of the pick up elements is difficult in general because the pick up elements are located in a planar construction within the base of the distributor. The rotor then mounted onto the assembly and the alignment of the rotor and the core elements appropriately adjusted. Difficulty is present, however, in visually checking the gapping and because repositioning of the core element with respect to one gap may vary the positioning with respect to another gap.

SUMMARY OF THE PRESENT INVENTION

The present invention is particularly directed to a simple, inexpensive and reliable tool for the accurate orientation of the pick-up core assembly upon replacement of the trigger coil or the like. Generally in accordance with the present invention the tool is a simple T-shaped tool having a precisely formed centering shaft of a precise length in combination with a core locating plate radially projecting from the locating shaft. The length of the pin or shaft is specially selected to precisely locate the core locating plate. In one embodiment the tool is specially formed for a given ignition system with the shaft correspondingly formed and the locating plate formed with a precisely formed annular face which is precisely parallel and concentric with the periphery of the locating pin. In an alternate embodiment of the invention the locating plate is formed with a chamfered face with the chamfer being precisely located and constructed to provide alternate annular surfaces for different ignition module units. The tool is a precision tool requiring appropriate construction of the interrelated surfaces. In assembly of an electronic ignition distribution, the mechanic removes the rotor and trigger coil. After replacement of the trigger coil, the core element is released and the special tool is carefully placed int the distribution with the shaft located within the rotor shaft located within the rotor bushing to precisely locate the annular locating plate. The core element is positioned precisely by the locating plate in the necessary concentric aligned orientation to the axis of the rotor shaft. The relative location of the annular locating surface provides slight engagement with the sharp pointed ends of the pyramidal elements on the core to provide for precision location of the sharp edges on the precise radius required for optimum positioning with respect to the rotating element of the rotor. Further, the mechanic can readily view each of the sharp elements to visually detect the physical condition of the tip of the pick up elements. This will permit the mechanic to insure the proper system operation upon replacement of the rotor which can of course be visually monitored prior to its replacement.

The present invention is a simple and inexpensive tool for the reliable and rapid assembly of electronic distributor assemblies. The tool is readily constructed as a rugged and long life tool for use in a vehicle repair shop.

BRIEF DESCRIPTION OF THE DRAWING

The drawing illustrates the best mode presently contemplated of carrying out the invention.

In the drawing.

DESCRIPTION OF THE ILLUSTRATED EMBODIMENT

Figure 1:
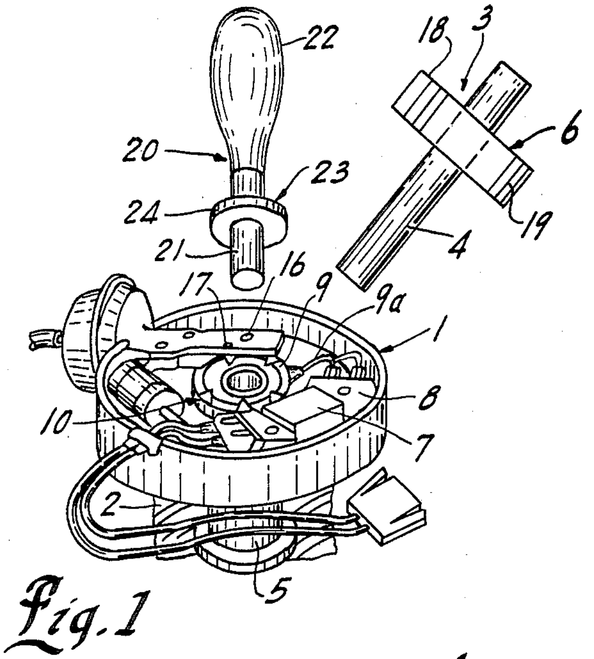
FIG. 1 is a pictorial view of an electronic distributor with the rotating timing core removed.
Figure 4:
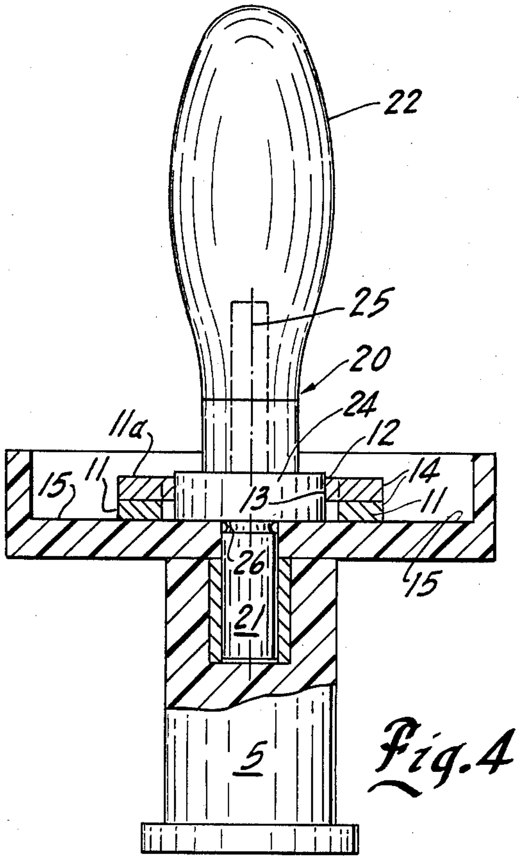
FIG. 4 is a vertical section taken generally on line 4—4 of FIG. 2.
Figure 2:
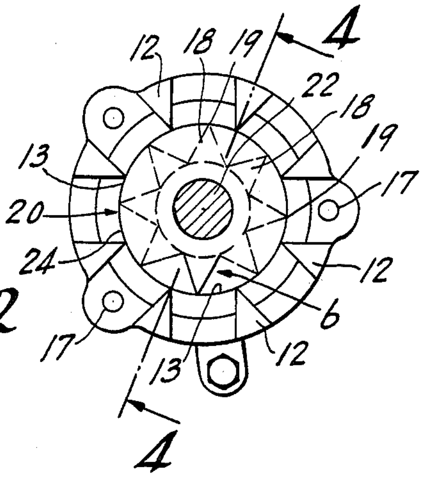
FIG. 2 is an enlarged plan view of the distributor housing shown in FIG. 1 with a tool constructed in accordance with this invention in place.

Referring to the drawings and particularly to FIG. 1, the electronic ignition distributor is illustrated including a distributor housing 1 which is adapted to be fixedly mounted to the internal combustion engine block 2, only partially shown. A rotating distributor timing core or rotor 3 is journalled in the housing 1. The rotor 3 includes a shaft 4 journalled in a bushing 5 within the housing 1 and projecting from the bottom of the house. The exposed end of the shaft 4 is coupled to the engine drive to provide precise orientation of a pyramidal rotor 6 with the position of the engine pistons in the internal combustion engine for establishing proper sequential firing of the internal combustion engine.

Generally the electronic ignition system includes an electronic module 7 for generating of a high voltage signal which is periodically coupled to the appropriate cylinder of the internal engine. The electronic module 7 is a triggered device which is triggered from a triggered module 8 in the distributor. An annular trigger coil 9 is secured by a retaining snap-ring 10*a* within an annular recess 10 in the distributor housing 1 concentric with the shaft opening and bushing 5. The coil 9 is connected by leads 9*a* to trigger module 8 for developing an appropriately shaped pulse for firing of the ignition system. A magnetic generator 10 is coupled to the coil 9 and consists of an annular magnet member 11 and a stacked annular magnetic pole price 11*a* mounted within the rotor housing 1 in concentric relation to the coil 9 and the magnetic rotor 6 secured to the rotor shaft. The annular pole piece 11*a* includes equicircumferentially spaced pyramids 12, one for each cylinder of the internal combustion engine. Each pyramid 12 extends horizontally inwardly, with the apex or peak 13 on a common circle and thus equicircumferentially spaced about the rotor 6. The annular magnet member 11 and the pole piece 11*a* each has an outer annular continuous base ring 14. The stacked member and pole piece are releasably secured to the base 15 of the rotor housing 1 by three equicircumferentially spaced locking screws or bolts 16 which extend through aligned bolt openings 17 in the respective member. The openings 17 in pole piece 11*a* generally have a slight circumferential and radial width permitting limited rotation and radial movement of the pole piece 11*a*. By slight loosening of the bolts 16, adjustment of the pyramids 12 can be provided. The adjustment permits accurate radial location of the pyramids 12 to establish a precise and common radius distance from the axis of the shaft, and thereby axis of the rotor 6, to the peak 13 of each pyramid. The gap between peak 13 and rotor 6 must be accurately adjusted for precise creation of pulse signals with respect to the timing of the cylinders.

The rotor 6 has a corresponding member of pyramids 18 secured to the shaft and extending horizontally radially outwardly to locate its apex or peak 19 on a radius just inwardly of the peaks 13 of the fixed pyramids 12. As the rotating pyramids 18 passes each of the fixed pyramids 12 a pulse signal is generated in the coil 9, which after appropriate processing and shaping is an electrical pulse signal suitable for triggering or firing of the ignition system for the related cylinder.

The appropriate ignition is related to maintaining of a proper gap between the rotating pyramid 17 and the fixed pyramids 12. Further, any disruption of the sharp edge 13 or 19 on either one of the pyramids 12 or 18 will significantly adversely effect the pulse signal. It is considered critical that the gap and appropriately shaped pyramids be maintained during the life of the ignition system. Any improper installation which results in physical interengagement of the rotating pyramid and the fixed pyramids of course rapidly destroys one or both of the pyramid structures. Further, excessive wear in the shaft supporting structure and particularly bushing 5 can also result in some physical engagement with a corresponding pyramid disruption. Finally, the coil leads 9*a* are rather fragile leads and have been found to constitute a rather significant source of ignition malfunction in the commercial environment, requiring disassembly of the rotor for removal and replacement of the coil unit. The reassembly is of course critical and all parts should be monitored and appropriately adjusted to insure proper system operation.

The present invention includes a simple stepped precision tool 20 for monitoring the condition of the rotor structure and the rotor support. In particular, the tool 20 consists of a shaft 21 secured to the end of a handle 22. The shaft 21 is precisely formed to correspond to the internal diameter of the shaft bushing 5 as well as the precise length of the shaft bushing.

An outer annular locator 23, shown as a solid heavy plate member, is integrally formed with the shaft 21. The annular locator 23 is precisely formed with an outer annular surface 24 with a precise constant radius with respect to the common axis 25 with the shaft 21. The shaft 21 at the immediate connection to plate 23 has a slight undercut 26 to maintain an optinum aligning tool.

In accordance with the present invention, if the ignition is not functioning properly, the distributor rotor 6 is removed, with visual inspection of the pyramids 12 and 18 and the a continuity check can also be run on the coil and leads to determine whether the coil and leads are functioning. The mechanic can readily determine whether or not the coil must be replaced.

Assuming the coil 9 is to be replaced, the coil retaining ring and the coil 9 is removed. The clamp bolts 16 for the magnet member 11 and pole piece 11*a* are loosened to permit the relatively free and accurate movement.

The time core and distributor shaft is released and the special tool 20 is carefully placed into the distribution shaft 21 located within the shaft bushing 5 to precisely locate the annular locating plate 23. The member 11 is positioned precisely by the locating plate 23 in the necessary concentric aligned orientation to the axis of the rotor shaft bushing 5. The relative location of the annular locating surface provides slight engagement with the sharp pointed ends of the pyramidal elements on the core to provide for precision location of the sharp edges on the precise radius required for optimum positioning with respect to the rotation element of the rotor.

With the tool in place, the bolts 16 are tightened to lock the magnet member 11 in place. The tool 20 is removed, and the rotor 6 inserted. The mechanic may again visually check the orientation. Thus, if the bushing 5 is worn, slight radial movement of the rotor 6 may occur with the engagement of the tips of the rotor pyramidal 17 with the fixed pyamid 12. The mechanic can accurately detect such a fault and replace the bushing if necessary after proper replacement and alignment of the member 11, the mechanic replaces the distributor cover 1 and circuit connection to complete the coil and/or magnetic member replacement.

Figure 5:
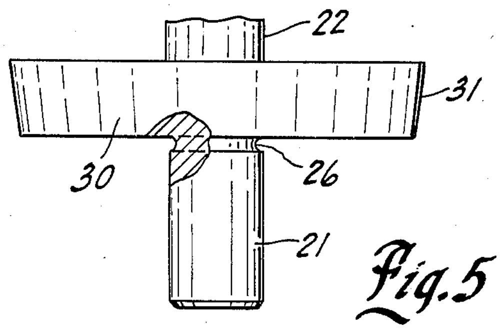
FIG. 5 is a fragmentary view illustrating a second embodiment of the embodiment.
Figure 3:
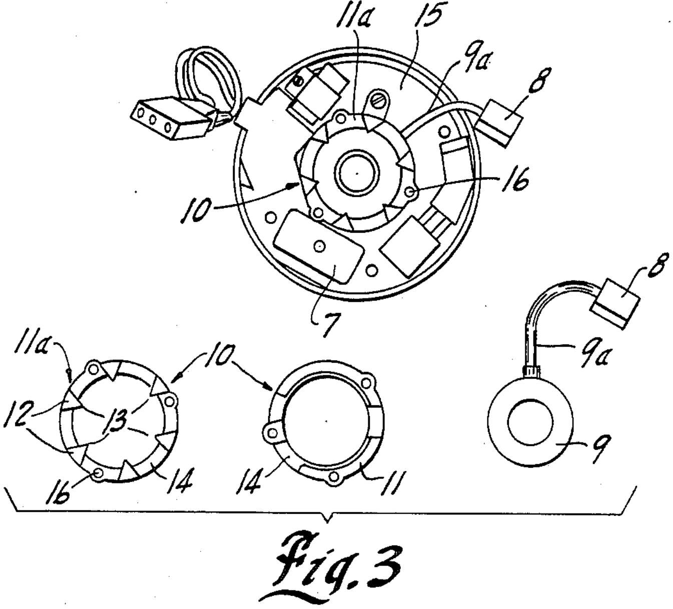
FIG. 3 is a plan view with several components of the pulse generator removed.

In the embodiment of FIG. 1-4, a tool is specially formed for a given ignition system with the shaft 21 correspondingly formed and the locating plate 23 formed with the locating periphery face or surface 24 which is precisely parallel and concentric with the periphery of the locating pin or shaft 21. An alternate embodiment of the invention is shown in FIG. 5. In the alternate embodiment, the locating plate 30 is formed with a chamfered locating surface or face 31, with the chamfer angle being precisely located and constructed to provide alternate axially-spaced annular surfaces for different ignition module units.

The present invention thus provides a simple and relatively inexpensive tool and method for properly aligning an electronic timing coil and core assembly.

Various modes of carrying out the invention are contemplated as being within the scope of the following claims particularly pointing out and distinctly claiming the subject matter which is regarded as the invention.

I claim:

1. The method of assembling an electronic ignition distributor including a rotor unit having a driven shaft located in a bushing and a rotating rotor means having an annular portion with a plurality of circumferentially spaced trigger members each projecting outwardly to a sharp outer end and an annular member having a plurality of inwardly extended and circumferentially spaced trigger members each having a sharp outer end, said sharp outer ends of the trigger members being located in close spaced relation to form a small air gap between the rotor unit and the annular member, comprising removing the rotor unit, locating a precision tool with a shaft of a diameter corresponding to said driven shaft in said bushing and with a locating plate extending radially outwardly from said shaft and aligned with said annular member, said plate having a precision round periphery having a radius corresponding to the predetermined location of said trigger members of said annular member, securing said annular member to said housing with said tool in place, removing said tool, replacing the rotor unit, and slowly rotating the rotor unit and inspecting the relative orientation of the rotor unit and annular member to detect any engagement of the rotor trigger members and the trigger members of the annular member.

2. The method of claim 1 wherein said trigger members are in the shape of a pyramid to define a sharp line edge, said annular member includes mounting means permitting small radial and circumferential positioning of the annular member whereby the step of placing the locating plate within said annular member moves the annular member to a precise location.

* * * * *